US009109670B2

(12) United States Patent
Roehm et al.

(10) Patent No.: US 9,109,670 B2
(45) Date of Patent: Aug. 18, 2015

(54) HANDHELD POWER TOOL HAVING A REDUCTION GEAR UNIT

(75) Inventors: Heiko Roehm, Stuttgart (DE); Ralf Windsheimer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 52 days.

(21) Appl. No.: 13/985,513

(22) PCT Filed: Feb. 1, 2012

(86) PCT No.: PCT/EP2012/051685
§ 371 (c)(1),
(2), (4) Date: Oct. 24, 2013

(87) PCT Pub. No.: WO2012/110321
PCT Pub. Date: Aug. 23, 2012

(65) Prior Publication Data
US 2014/0051539 A1   Feb. 20, 2014

(30) Foreign Application Priority Data

Feb. 15, 2011   (DE) .......................... 10 2011 004 126

(51) Int. Cl.
*F16H 3/62* (2006.01)
*B25F 5/00* (2006.01)
*F16D 7/00* (2006.01)

(52) U.S. Cl.
CPC ....... *F16H 3/62* (2013.01); *B25F 5/001* (2013.01); *F16D 7/00* (2013.01)

(58) Field of Classification Search
CPC .............. F16H 3/62; F16D 7/00; B25F 5/001

USPC ............ 475/298, 299, 263, 264, 265; 81/464; 173/47, 216, 217
See application file for complete search history.

(56) References Cited

U.S. PATENT DOCUMENTS

| 2,764,272 | A | * | 9/1956 | Reynolds | 192/150 |
| 4,528,470 | A | * | 7/1985 | Young et al. | 310/78 |
| 5,339,908 | A | * | 8/1994 | Yokota et al. | 173/216 |
| 6,796,921 | B1 | | 9/2004 | Buck et al. | |
| 7,730,964 | B2 | | 6/2010 | Simm et al. | |

(Continued)

FOREIGN PATENT DOCUMENTS

| CN | 1519080 | 8/2004 |
| CN | 101242935 | 8/2008 |

(Continued)

OTHER PUBLICATIONS

International Search Report, PCT International Application No. PCT/EP2012/051685, dated Jul. 13, 2012.

*Primary Examiner* — Roger Pang
(74) *Attorney, Agent, or Firm* — Kenyon & Kenyon LLP

(57) ABSTRACT

In a handheld power tool having a reduction gear unit, drivable by a motor, for driving a drive shaft, the reduction gear unit being situated in a gear housing and being shiftable via a gearshift at least between a first gear having a comparatively high torque and a second gear having a comparatively low torque, the reduction gear unit is assigned a mechanical overload protection device which is designed to limit the reduction gear unit during operation of the handheld power tool, if a torque, transferred from the drive shaft to the reduction gear unit, exceeds a machine-specific limiting value.

8 Claims, 4 Drawing Sheets

(56) References Cited

U.S. PATENT DOCUMENTS

| | | | |
|---|---|---|---|
| 2006/0068968 A1* | 3/2006 | Eisenhardt | 475/299 |
| 2006/0287157 A1* | 12/2006 | Katoh et al. | 475/263 |
| 2007/0023196 A1 | 2/2007 | Hara et al. | |
| 2007/0114050 A1* | 5/2007 | Baumann et al. | 173/216 |
| 2008/0173459 A1* | 7/2008 | Kuroyanagi et al. | 173/216 |
| 2010/0236805 A1* | 9/2010 | Saur | 173/216 |
| 2011/0017484 A1* | 1/2011 | Roehm | 173/178 |
| 2011/0147029 A1* | 6/2011 | Roehm et al. | 173/176 |
| 2011/0220377 A1* | 9/2011 | Roehm | 173/47 |
| 2013/0025899 A1* | 1/2013 | Kuehne | 173/216 |
| 2013/0267374 A1* | 10/2013 | Blum et al. | 475/299 |
| 2014/0174775 A1* | 6/2014 | Parks | 173/47 |

FOREIGN PATENT DOCUMENTS

| | | |
|---|---|---|
| DE | 2936993 | 4/1981 |
| DE | 20 2004 004 749 | 9/2005 |
| DE | 10 2005 037 254 | 2/2007 |
| EP | 1 946 895 | 7/2008 |
| GB | 2 058 253 | 4/1981 |

\* cited by examiner

HANDHELD POWER TOOL HAVING A REDUCTION GEAR UNIT

FIELD

The present invention relates to a handheld power tool having a reduction gear unit, drivable by a motor, for driving a drive shaft, the reduction gear unit being situated in a gear housing and being shiftable via a gearshift at least between a first gear having a comparatively high torque and a second gear having a comparatively low torque.

BACKGROUND INFORMATION

Such handheld power tools often have a reduction gear unit for driving a drive shaft, using which a predefined motor speed may be reduced to a speed range of the drive shaft which is necessary for a particular application. For example, motor speeds of approximately 20,000 RPM are reduced to a speed range of approximately 150 RPM to 2,000 RPM in cordless screwdrivers, cordless combi drills, and/or cordless percussion drills. The reduction gear units are, for example, designed as multistage planetary gear sets having at least two gears, so that a user of such a handheld power tool is, for example, able to shift this handheld power tool between a first, slower, gear having a comparatively high torque and a second, faster, gear having a comparatively low torque. Moreover, the reduction gear unit may be assigned a torque clutch using which it is possible to prevent the drive shaft from being driven by the reduction gear unit during operation of the handheld power tool, if a torque, transferred from the drive shaft to the reduction gear unit, exceeds a threshold value settable by a user.

The disadvantage of the above-described power drills is that in the case of cordless combi drills, the torque clutch or a clutch functionality provided by the torque clutch is deactivated in the drilling mode, thus setting the threshold value settable by the user virtually to "infinitely." If, however, the cordless combi drill set to the drilling mode is used for screwing, a kinetic energy of rotation conveyed to the drive shaft may be converted into a rotation of the cordless combi drill or a tool housing assigned thereto, for example, in the event of so-called hard screw applications which may occur during metal screw fittings, for example, and may cause a spontaneous blocking of the drive shaft. This may result in an impact-like load on components of a drive train assigned to the cordless combi drill and in a failure of the components of the drive train involved.

SUMMARY

One object of the present invention is to provide a handheld power tool during operation of which a conveyance of a comparatively high kinetic energy of rotation to an assigned tool housing via the drive shaft of this handheld power tool may be at least limited independently of a set operating mode.

In accordance with the present invention, an example handheld power tool is provided having a reduction gear unit, drivable by a motor, for driving a drive shaft. The reduction gear unit is situated in a gear housing and is shiftable via a gearshift between a first gear having a comparatively high torque and a second gear having a comparatively low torque. The reduction gear unit is assigned a mechanical overload protection device which is designed to limit the reduction gear unit during operation of the handheld power tool, if a torque, transferred from the drive shaft to the reduction gear unit, exceeds a machine-specific limiting value.

The present invention thus makes possible the provision of a handheld power tool during whose operation a conveyance of excessive kinetic energy of rotation to the tool housing, assigned to the handheld power tool, via the drive shaft of the handheld power tool may be effectively and reliably prevented.

According to one specific embodiment, the reduction gear unit is assigned a torque clutch which is designed to prevent the drive shaft from being driven by the reduction gear unit during operation of the handheld power tool, if a torque, transferred from the drive shaft to the reduction gear unit, exceeds a threshold value settable by a user of the handheld power tool. The machine-specific limiting value is preferably greater than a maximum threshold value settable by the user of the handheld power tool.

In this way, a handheld power tool may be made available in a simple manner which, on the one hand, is protected by the machine-specific overload protection from a comparatively high torque, which is predefined independently of a user, being transferred from the drive shaft to the tool housing, and, on the other hand, may be protected by a torque clutch, operable by a user, from a comparatively low torque being transferred which is settable by the user at least within predefined limits.

According to one specific embodiment, the reduction gear unit is designed in the form of a planetary gear set having at least three planetary stages. The overload protection device is preferably assigned to a planetary stage which is not directly connected to either the gearshift or the torque clutch.

The present invention thus allows the provision of a solid and small reduction gear unit having a robust overload protection device.

The planetary stage to which the overload protection device is assigned preferably faces the motor.

This makes it possible to design the overload protection device in a simple manner on the planetary gear set.

The planetary stage to which the overload protection device is assigned preferably has an annulus gear which is coupled to the gear housing via at least one latching spring element.

In this way, an uncomplicated and cost-effective overload protection device may be provided.

According to one specific embodiment, the annulus gear is rotatably fixedly situated in the gear housing until the machine-specific limiting value is reached for the case that a torque is transferred from the drive shaft to the reduction gear unit and is able to rotate in the gear housing around a longitudinal axis assigned to the drive shaft if the machine-specific limiting value is exceeded.

The present invention thus makes possible the provision of a safe and reliable overload protection device.

The at least one latching spring element is preferably situated resiliently on the annulus gear in the radially outward direction. Alternatively thereto, the at least one latching spring element may act resiliently against the annulus gear in the radially inward direction.

In this way, a simple and robust overload protection device may be provided.

According to one specific embodiment, a latching element, which is rotatably fixedly connected to the gear housing, is provided in the radial direction between the annulus gear and the gear housing.

The present invention thus allows the latching spring element to latch solidly and directly with the gear housing during normal operation of the handheld power tool.

In accordance with the present invention, a mechanical overload protection device is provided for a handheld power tool which has a reduction gear unit, drivable by a motor, for driving a drive shaft, the reduction gear unit being situated in a gear housing and being shiftable via a gearshift at least between a first gear having a comparatively high torque and a second gear having a comparatively low torque. The overload protection device is designed to limit the reduction gear unit during operation of the handheld power tool, if a torque, transferred from the drive shaft to the reduction gear unit, exceeds a machine-specific limiting value.

BRIEF DESCRIPTION OF THE DRAWINGS

The present invention is explained in greater detail below with reference to exemplary embodiments.

DETAILED DESCRIPTION OF EXAMPLE EMBODIMENTS

Figure 1:
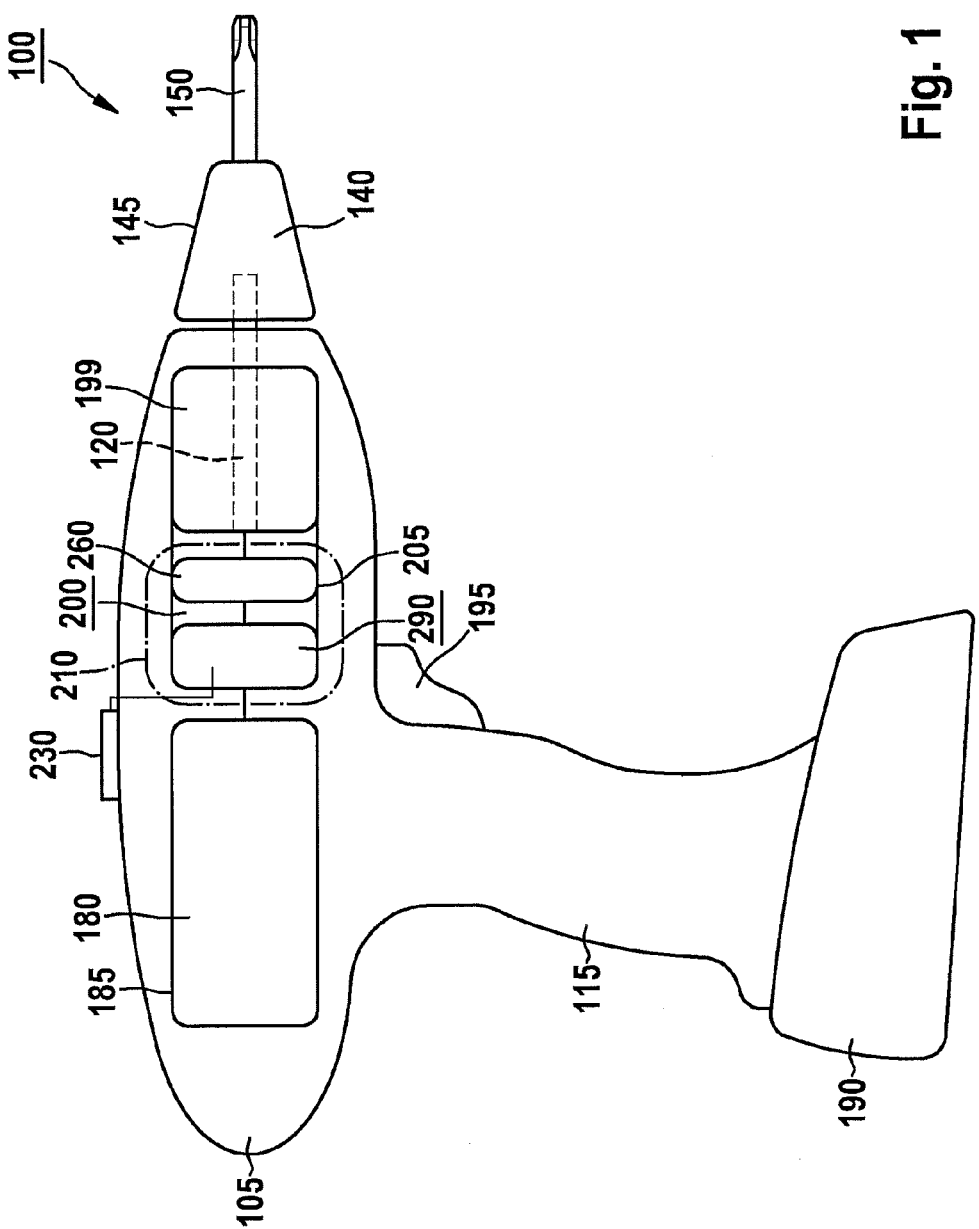
FIG. 1 shows a schematic view of a handheld power tool according to one specific embodiment.

FIG. 1 shows an exemplary handheld power tool 100 which has a tool housing 105 including a handle 115. According to one specific embodiment, handheld power tool 100 is connectable mechanically and electrically to a battery pack 190 for a mains-independent power supply. In FIG. 1, handheld power tool 100 is designed as a cordless combi drill as an example. It is, however, pointed out that the present invention is not limited to cordless combi drills, but may also be used with various handheld power tools in which a tool is set into rotation regardless of whether the handheld power tool is mains-operable or operable mains-independently using battery pack 190, e.g., with a screwdriver or a cordless screwdriver, a percussion drill, or a cordless percussion drill, etc.

An electric drive motor 180, which is supplied with current by battery pack 190, and a gear unit 200 are situated in tool housing 105. Drive motor 180 is connected to a drive shaft 120, e.g., a drive spindle, via gear unit 200. Drive motor 180 is illustratively situated in a motor housing 185 and gear unit 200 in a gear housing 205, gear housing 205 and motor housing 185 being situated in tool housing 105 as an example. A tool holder 140, which has a drill chuck 145 as an example, is assigned to gear unit 200. This tool holder 140 is used to hold a tool 150 and may be integrally connected to drive shaft 120 drivable by drive motor 180 via gear unit 200, or may be connected to it in the form of an attachment.

Drive motor 180 is, for example, operable via a manual switch 195, i.e., may be switched on and off, and may be any type of motor, e.g., an electronically commutated motor or a DC motor. Preferably, drive motor 180 may be controlled or regulated electronically in such a way that a reverse operation and input with regard to a desired rotational speed are implementable. The mode of operation and the design of a suitable drive motor are conventional so that a detailed description thereof is dispensed with for the sake of a concise description.

According to one specific embodiment, gear unit 200 is a reduction gear unit, e.g., a planetary gear set having different planetary stages, to which a torque clutch 199 is optionally assigned. Torque clutch 199 is designed to prevent drive shaft 120 from being driven by reduction gear unit 200 during operation of handheld power tool 100, if a torque, transferred from drive shaft 120 to reduction gear unit 200, exceeds a threshold value which is settable by the user of handheld power tool 100.

Moreover, reduction gear unit 200 is assigned a gearshift 260 operable via an assigned operating element 230, so that reduction gear unit 200 is shiftable at least between a first gear having a comparatively high torque and a second gear having a comparatively low torque. During operation of handheld power tool 100, reduction gear unit 200 is rotatably driven by drive motor 180. Reduction gear unit 200, which is illustratively designed as a planetary gear set, is described in detail below with reference to an enlarged section view from FIG. 2 as well as with reference to an enlarged perspective view of a detail 210 of handheld power tool 100 from FIG. 3.

According to one specific embodiment, reduction gear unit 200 is assigned a mechanical overload protection device 290. This overload protection device is designed to limit reduction gear unit 200 during operation of handheld power tool 100, if a torque, transferred from drive shaft 120 to reduction gear unit 200, exceeds a machine-specific limiting value. The machine-specific limiting value is greater than a maximum threshold value settable by the user of handheld power tool 100 via torque clutch 199.

In the context of the present invention, a limitation of reduction gear unit 200 by overload protection device 290 is to be understood to mean that a torque, transferred from reduction gear unit 200 to drive shaft 120, is at least reduced by overload protection device 290 in the event of a blocking of drive shaft 120, e.g., in the event of hard screw applications, in order to thereby delimit the kinetic energy of rotation transferred from drive shaft 120 to gear housing 205 and thus tool housing 105. In addition, the mode of operation and the design of a suitable torque clutch are conventional, so that a detailed description of torque clutch 199 is dispensed with for the sake of a concise description.

Figure 2:
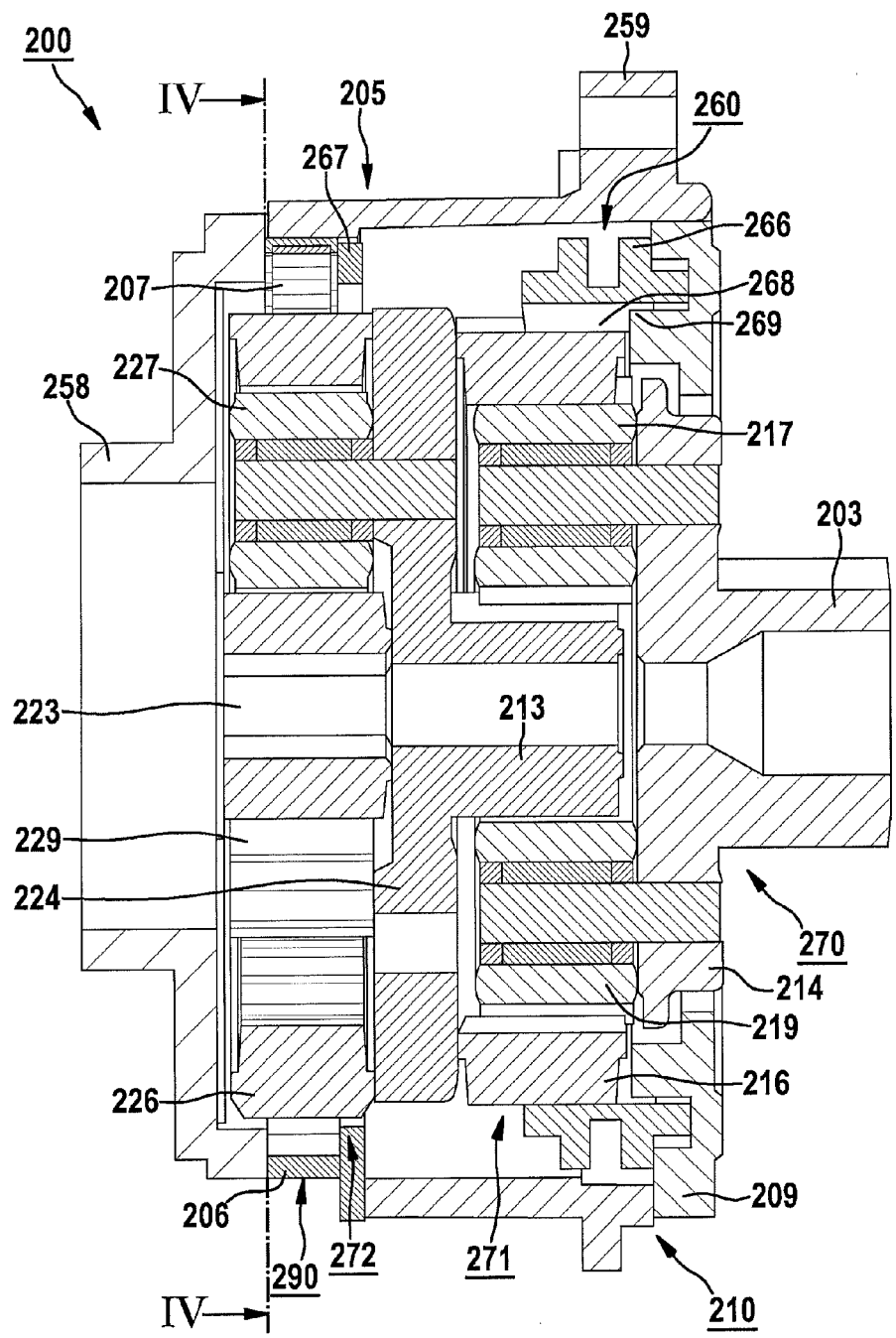
FIG. 2 shows an enlarged sectional view of a detail of the handheld power tool from FIG. 1.

FIG. 2 shows detail 210 of handheld power tool 100 from FIG. 1. This detail illustrates an exemplary embodiment of reduction gear unit 200 from FIG. 1, implemented as a planetary gear set, whose gear housing 205 illustratively has a housing back section 258 and a housing front section 259. Here, housing back section 258 may be formed by motor housing 185 from FIG. 1, for example.

Planetary gear set 200 illustratively has three planetary stages situated in gear housing 205: a front stage 270, a central stage 271, and a rear stage 272. Front planetary stage 270 is connected to drive shaft 120 from FIG. 1 and is represented here only by an exemplary sunwheel 203. Central planetary stage 271, as an example, has a sunwheel 213, at least one first and one second planetary wheels 217 and 219, a planet carrier 214, as well as an annulus gear 216 which is situated axially fixed, but radially movable in gear housing 205. Planet carrier 214 forms sunwheel 203 of front planetary stage 270; sunwheel 203 may be fastened appropriately to planet carrier 214 or may be integrally connected to it or may be designed in one piece with it. Illustratively, planet carrier 214 is situated at least sectionally within a fastening ring 209 which is rotatably fixedly connected to gear housing 205 and which has a holding contour 269, and which fastens planet carrier 214 in gear housing 205 in an axially fixed, but radially movable manner. Rear planetary stage 272, as an example, has a sunwheel 223, at least one first and one second planetary wheels 227 and 229, a planet carrier 224, as well as an annulus gear 226 which is situated axially fixed. The latter is illustratively situated at least sectionally within an annular latching element 206 which is rotatably fixedly connected to gear housing 205. Sunwheel 223 is, for example, formed from a pinion which is assigned to motor 180 from FIG. 1 and which drives planetary gear set 200 during operation of handheld power tool 100 from FIG. 1. Planet carrier 224 forms sunwheel 213 of central planetary stage 271; sunwheel 213 may be fastened appropriately to planet carrier 224 or may be integrally connected to it or may be designed in one piece with it.

According to one specific embodiment, planetary gear set 200 is shiftable via gearshift 260 from FIG. 1 between a first and a second gear, as described for FIG. 1. For this purpose, gearshift 260 is assigned a ratchet wheel 266, which is situated on planetary gear set 200, is axially displaceable and radially movable, and which is rotatably fixedly connected to annulus gear 216 of central planetary stage 271 via an assigned entrainer contour 268.

Figure 3:
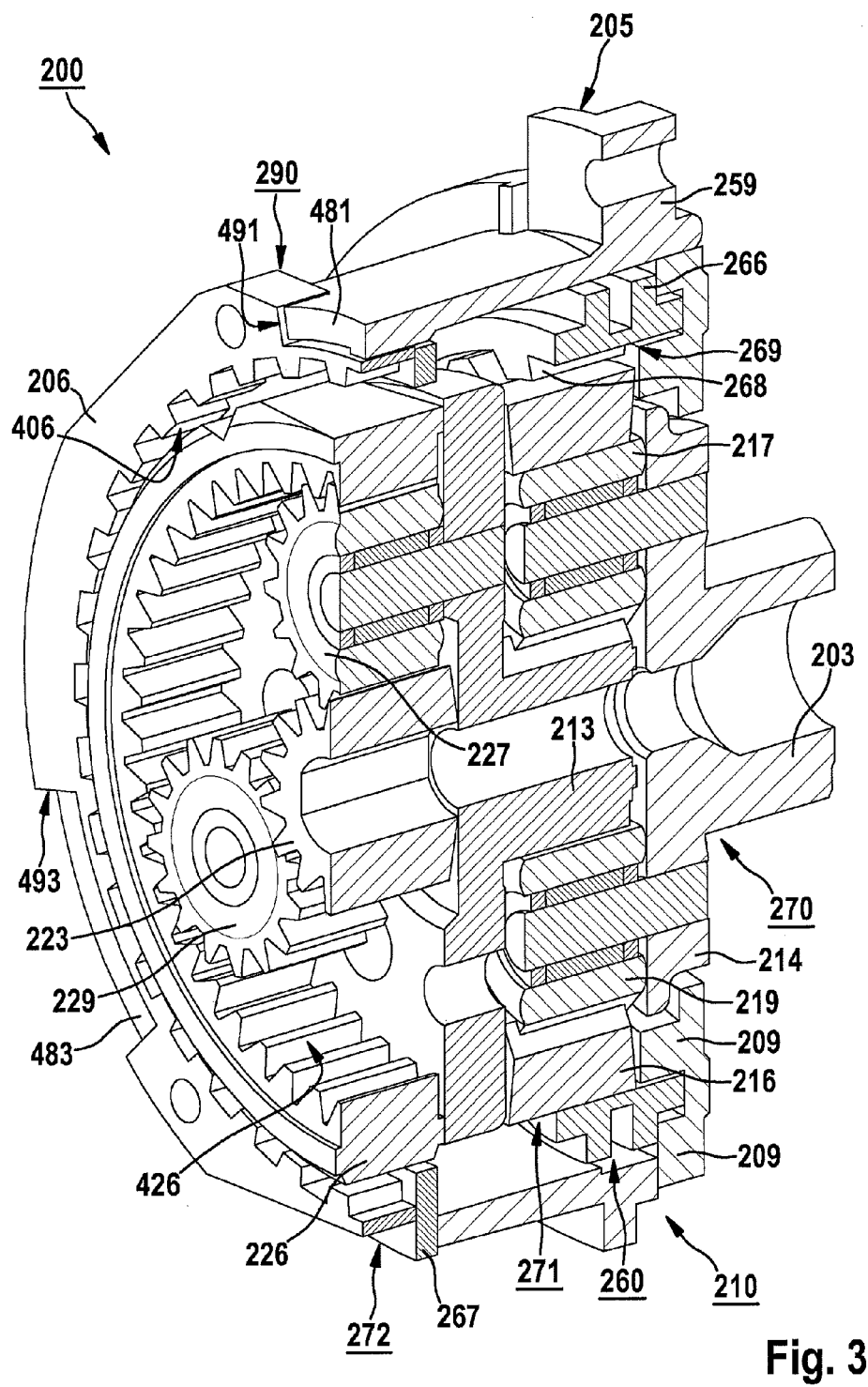
FIG. 3 shows a perspective view of a detail of the handheld power tool from FIG. 1.

According to one specific embodiment, ratchet wheel 266 is shiftable in the axial direction of gear housing 205 from a first into a second operating position when operating element 230 from FIG. 1 is operated, the first operating position being, for example, assigned to the first gear and the second operation position being, for example, assigned to the second gear of planetary gear set 200. In its first operating position, ratchet wheel 266 is rotatably fixedly connected to planet carrier 224 of rear planetary stage 272, so that this planet carrier 224 and annulus gear 216 of central planetary stage 271 are rotatably fixedly connected to one another. In this way, central planetary stage 271 is deactivated, so that the first gear is activated at a comparably high torque. In its second operating position, which is shown in FIGS. 2 and 3, ratchet wheel 266 is rotatably fixedly connected to fastening ring 209 and thus to gear housing 205 in that entrainer contour 268 of ratchet wheel 266 engages with holding contour 269 of fixing ring 209, so that annulus gear 216 of central planetary stage 271 is rotatably fixedly fastened in gear housing 205. In this way, central planetary stage 271 is activated, so that the second gear is activated at a comparably low torque.

Since the design and mode of operation of a planetary gear set having a gearshift are sufficiently conventional, a detailed description thereof is dispensed with for the sake of a concise description.

According to one specific embodiment, annular latching element 206, in which annulus gear 226 of rear planetary stage 272 is at least sectionally situated, is assigned to overload protection device 290 from FIG. 1 and is illustratively axially fixedly fastened at least within predefined tolerances within or on gear housing 205 using a retainer ring 267 attached on housing front section 259 of gear housing 205. On annulus gear 226, at least one latching spring element 207 (as well as 407, 409 in FIG. 4) is situated, as an example, which is assigned to overload protection device 290, and via which annulus gear 226 is coupled to latching element 206 and thus to gear housing 205, as described below for FIG. 4.

Overload protection device 290 is preferably assigned to a planetary stage which is not directly connected to either gearshift 260 or torque clutch 199 from FIG. 1. Particularly preferably, overload protection device 290 is assigned to a planetary stage which faces motor 180 from FIG. 1. Accordingly, overload protection device 290 in FIG. 2 is illustratively assigned to rear planetary stage 272 which faces motor 180 from FIG. 1 and is not directly connected to either gearshift 260 or to torque clutch 199 from FIG. 1.

FIG. 3 shows detail 210 of handheld power tool 100 from FIGS. 1 and 2 in a perspective view. FIG. 3 illustrates the axial fastening of latching element 206 of overload protection device 290 on gear housing 205 using retainer ring 267. Moreover, FIG. 3 illustrates a toothing 426 which is provided on the inner periphery of annulus gear 226 of rear planetary stage 272 and which is operatively linked to planetary wheels 227, 229, as well as the rotatably fixed connection of ratchet wheel 266 via its entrainer contour 268 with annulus gear 216 of central planetary stage 271 as well as to fastening ring 209 via its holding contour 269 in the second gear of handheld power tool 100 from FIG. 1.

According to one specific embodiment, annular latching element 206 of overload protection device 290 has a latching toothing 406 on its inner periphery and radial recesses 491, 493 (and 492 in FIG. 4) on its outer periphery. Protrusions 481, 483 (and 482 in FIG. 4), which are provided on housing front section 259 of gear housing 205, illustratively engage with these recesses so that latching element 206 is rotatably fixedly connected to gear housing 205. Latching toothing 406 is coupled to latching spring element 207 (as well as 407, 409 in FIG. 4), which is assigned to overload protection device 290, as described below for FIG. 4.

Figure 4:
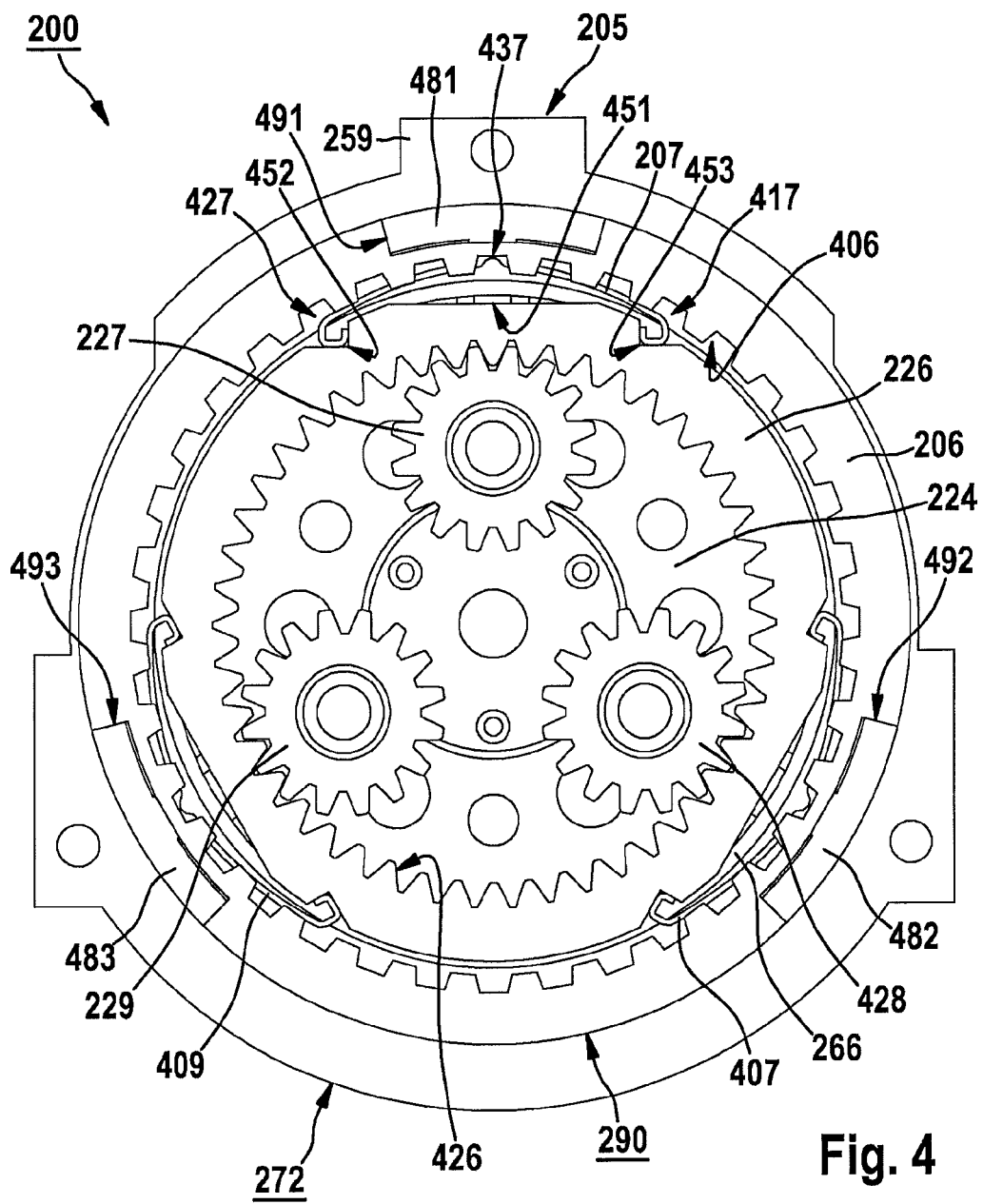
FIG. 4 shows a section view of the handheld power tool from FIG. 1, viewed along a line IV-IV from FIG. 2.

FIG. 4 shows a section through rear planetary stage 272 of planetary gear set 200 from FIGS. 2 and 3, an illustration of sunwheel 223 being dispensed with to simplify the figure. FIG. 4 shows another planetary wheel 428 of rear planetary stage 272 and illustrates the design of radial recesses 491, 493 as well as of another radial recess 492 on annular latching element 206, with which protrusions 481 and 483, provided on gear housing 205, as well as another protrusion 482 engage for rotatably fixed fastening.

According to one specific embodiment, on the outer periphery of annulus gear 226 of rear planetary stage 272, at least one flattening 451 as well as at least two assigned recesses 452, 453 are provided which have a rectangular shape, for example, and are assigned to overload protection device 290 from FIGS. 2 and 3. Latching spring element 207 is illustratively situated in the area of flattening 451. As an example, this latching spring element is designed in the form of a curly bracket having an approximately central detent lug 437 and rounded end areas 427, 417 which are mounted to be freely movable in recesses 452 and 453. Here, rounded end area 427 is acted on by a predefined spring tension in the direction of rounded end area 417 and end area 417 is acted on in the direction of end area 427. In this way, latching spring element 207 is mounted resiliently on annulus gear 226 in the radially outward direction, so that detent lug 437 is operatively engaged with latching toothing 406 of annular latching element 206 during normal operation of handheld power tool 100 from FIG. 1.

It is pointed out that in FIG. 4 two other latching spring elements 407, 409 are illustratively shown which are situated in the area of flattenings and recesses which have a similar design as flattening 451 and recesses 452, 453. For the sake of simplicity and clarity of the figure, these flattenings and recesses have, however, not been denoted. Furthermore, it is pointed out that three latching spring elements 207, 407, 409 are each offset in relation to one another by an angle of 120°, for example. However, other configurations and a different number of latching spring elements are also possible. For example, only two latching spring elements may be used which are offset by an angle of 180° in relation to one another, a floating fit of annulus gear 226 in annular latching element 206 being achievable if two or more latching spring elements are used.

Moreover, it is pointed out that latching spring elements 207 which are resilient in the radially outward direction and which engage with latching toothing 406 provided on the inner periphery of annular latching element 206 are described only as an example and are replaceable by other equivalent approaches. Alternatively thereto, latching spring elements which are resilient in the radially inward direction and which engage with the latching toothing provided on the outer periphery of annulus gear 226 could, for example, be situated on the inner periphery of latching element 406.

During normal operation of handheld power tool 100 from FIG. 1, annulus gear 226 is rotatably fixedly connected to latching element 206, and thus rotatably fixedly coupled to gear housing 205, via latching spring elements 207, 407, 409 by detent lugs 437 of these latching spring elements engaging with latching toothing 406 of annular latching element 206. Thus, planetary wheels 227, 229, 428 may rotate along toothing 426 provided on the inner periphery of annulus gear 226, if these are driven by sunwheel 223 from FIGS. 2 and 3, a torque which is generated by drive motor 180 from FIG. 1 and reduced by planetary gear set 200 being transferred to drive shaft 120 from FIG. 1.

For the case of an at least partial blocking of drive shaft 120 from FIG. 1, e.g., in the event of hard screw applications, this torque is at least partially transferred back from drive shaft 120 to reduction gear unit 200 and thus to gear housing 205 and tool housing 105 from FIG. 1. If, in the process, the back-transferred torque exceeds a machine-specific limiting value which is, for example, predefinable by a selected stiffness or spring force of latching spring elements 207, 407, 409 and/or the design of latching toothing 406, among other things, detent lugs 437 slide out of the operative engagement with latching toothing 406 due to an elastic deformation of latching spring elements 207, 407, 409.

In the case of such a resilient deformation, detent lugs 437 of latching spring elements 207, 407, 409 are pressed against their spring force radially inward in the direction of assigned flattenings 451, so that each of rounded end areas 417 or 427 are pressed outward, viewed in the tangential direction of annulus gear 226, as a function of a particular direction of rotation of annulus gear 226. In this way, annulus gear 226 may rotate in gear housing 205 around a longitudinal axis assigned to drive shaft 120 from FIG. 1 at least until the back-transferred torque exceeds the machine-specific limiting value again. In the context of the present invention, this is referred to as a limitation of planetary gear set 200, as described above.

What is claimed is:

1. A handheld power tool, comprising:
    a gear housing;
    a motor;
    a drive shaft; and
    a reduction gear unit, drivable by the motor for driving the drive shaft, the reduction gear unit being situated in the gear housing and being shiftable via a gearshift at least between a first gear having a comparatively high torque and a second gear having a comparatively low torque, wherein the reduction gear unit is assigned a mechanical overload protection device which is designed to limit the reduction gear unit during operation of the handheld power tool, if a torque transferred from the drive shaft to the reduction gear unit exceeds a machine-specific limiting value,
    wherein the reduction gear unit is assigned a torque clutch which is designed to prevent the drive shaft from being driven by the reduction gear unit during operation of the handheld power tool, if a torque, transferred from the drive shaft to the reduction gear unit, exceeds a threshold value which is settable by a user of the handheld power tool, the machine-specific limiting value being greater than a maximum threshold value settable by the user of the handheld power tool,
    wherein the reduction gear unit is designed in the form of a planetary gear set having at least three planetary stages, the overload protection device being assigned to one of the planetary stages which is not directly connected to either the gearshift or to the torque clutch.

2. The handheld power tool as recited in claim 1, wherein the planetary stage to which the overload protection device is assigned faces the motor.

3. The handheld power tool as recited in claim 1, wherein the planetary stage to which the overload protection device is assigned has an annulus gear which is coupled to the gear housing via at least one latching spring element.

4. The handheld power tool as recited in claim 3, wherein the annulus gear is rotatably fixedly situated in the gear housing until the machine-specific limiting value is reached for the case that a torque is transferred from the drive shaft to the reduction gear unit and is able to rotate in the gear housing around a longitudinal axis assigned to the drive shaft if the machine-specific limiting value is exceeded.

5. The handheld power tool as recited in claim 3, wherein the at least one latching spring element is situated resiliently on the annulus gear in a radially outward direction.

6. The handheld power tool as recited in claim 3, wherein the at least one latching spring element acts resiliently against the annulus gear in a radially inward direction.

7. The handheld power tool as recited in claim 3, wherein a latching element, which is rotatably fixedly connected to the gear housing, is provided in a radial direction between the annulus gear and the gear housing.

8. A mechanical overload protection device for a handheld power tool comprising:
    a reduction gear unit, drivable by a motor, for driving a drive shaft, the reduction gear unit being situated in a gear housing and being shiftable via a gearshift at least between a first gear having a comparatively high torque and a second gear having a comparatively low torque, wherein the overload protection device is designed to limit the reduction gear unit during operation of the handheld power tool, if a torque transferred from the drive shaft to the reduction gear unit exceeds a machine-specific limiting value,
    wherein the reduction gear unit is assigned a torque clutch which is designed to prevent the drive shaft from being driven by the reduction gear unit during operation of the handheld power tool, if a torque, transferred from the drive shaft to the reduction gear unit, exceeds a threshold value which is settable by a user of the handheld power tool, the machine-specific limiting value being greater than a maximum threshold value settable by the user of the handheld power tool, wherein the reduction gear unit is designed in the form of a planetary gear set having at least three planetary stages, the overload protection device being assigned to one of the planetary stages which is not directly connected to either the gearshift or to the torque clutch.

* * * * *